United States Patent
Dalia

(10) Patent No.: US 10,943,193 B1
(45) Date of Patent: Mar. 9, 2021

(54) FOOD AND BEVERAGE VENUE MANAGEMENT SYSTEM

(71) Applicant: Saverio Dalia, Staatsburg, NY (US)

(72) Inventor: Saverio Dalia, Staatsburg, NY (US)

(*) Notice: Subject to any disclaimer, the term of this patent is extended or adjusted under 35 U.S.C. 154(b) by 391 days.

(21) Appl. No.: 15/970,545

(22) Filed: May 3, 2018

(51) Int. Cl.
*G06Q 10/06* (2012.01)
*G06Q 50/12* (2012.01)
*G06Q 10/08* (2012.01)
*G06Q 20/40* (2012.01)

(52) U.S. Cl.
CPC ... *G06Q 10/063114* (2013.01); *G06Q 10/087* (2013.01); *G06Q 20/40* (2013.01); *G06Q 50/12* (2013.01)

(58) Field of Classification Search
CPC .............. G06Q 50/12; G06Q 10/0631; G06Q 30/0621; G06Q 10/063112; G06Q 30/0268; G06Q 10/06; G06Q 20/20; H04W 4/021
See application file for complete search history.

(56) References Cited

U.S. PATENT DOCUMENTS

| | | | | |
|---|---|---|---|---|
| 6,865,261 B1* | 3/2005 | Rao | .................... | G06Q 30/0643 379/93.12 |
| 7,257,547 B1* | 8/2007 | Terase | .................. | G06Q 10/087 705/15 |
| 7,385,479 B1* | 6/2008 | Green | .................... | G06Q 10/00 340/286.02 |
| 7,483,842 B1* | 1/2009 | Fung | ..................... | G06Q 30/02 705/7.14 |
| 7,788,188 B2 | 8/2010 | Kramer | | |
| 7,856,360 B2 | 12/2010 | Kramer et al. | | |
| 7,945,477 B2* | 5/2011 | Werbitt | .............. | G06Q 30/0281 705/15 |
| 8,554,670 B1* | 10/2013 | Blank | .................... | G06Q 30/06 705/39 |

(Continued)

FOREIGN PATENT DOCUMENTS

| | | |
|---|---|---|
| EP | 1176840 | 1/2002 |
| WO | WO2007090133 | 8/2007 |

OTHER PUBLICATIONS

Point-of-Sales POPs for Restaurant User's Manua POSBank, 2002 (Year: 2002).*

(Continued)

*Primary Examiner* — Scott L Jarrett
(74) *Attorney, Agent, or Firm* — Goldstein Law Offices, P.C.

(57) ABSTRACT

A food and beverage management system adapted to improve the operations of a food and beverage venue, comprising a customer client module, a staff client module, a management client module, and a management control unit. The venue management system is adapted to track and analyze customer and staff activity, assess staff performance, and analyze transaction data received from a POS system. The venue management system allows a manager to assess the operation of the venue by generating real-time summaries and detailed analytics reports for the customer, staff, and venue data, which are displayed via the management client module. The management client module further allows the manager to interact with customers by sending a message or a complimentary menu item, and assign tasks to staff members.

16 Claims, 12 Drawing Sheets

(56) References Cited

U.S. PATENT DOCUMENTS

| | | | | |
|---|---|---|---|---|
| 8,756,156 | B1* | 6/2014 | Campi | G06Q 30/0643 |
| | | | | 705/40 |
| 9,179,261 | B2 | 11/2015 | De Vries | |
| RE46,731 | E * | 2/2018 | Woycik | G01N 3/565 |
| 10,032,144 | B1* | 7/2018 | Jacob | G06Q 20/403 |
| 10,333,886 | B2* | 6/2019 | Davis | H04L 51/32 |
| 10,402,798 | B1* | 9/2019 | Varma | G06Q 20/40 |
| 2004/0019525 | A1* | 1/2004 | Kish | G06Q 10/10 |
| | | | | 705/15 |
| 2004/0049427 | A1* | 3/2004 | Tami | G06Q 20/209 |
| | | | | 705/24 |
| 2004/0138944 | A1* | 7/2004 | Whitacre | G06Q 10/06398 |
| | | | | 705/7.42 |
| 2005/0125363 | A1* | 6/2005 | Wilson | G06Q 20/40 |
| | | | | 705/75 |
| 2006/0020509 | A1* | 1/2006 | Strain | G06Q 30/0224 |
| | | | | 705/14.25 |
| 2006/0169768 | A1* | 8/2006 | Gangi | G06Q 20/40145 |
| | | | | 235/380 |
| 2007/0043811 | A1* | 2/2007 | Kim | G06Q 10/06 |
| | | | | 709/203 |
| 2007/0179792 | A1* | 8/2007 | Kramer | G06Q 50/01 |
| | | | | 705/1.1 |
| 2007/0239549 | A1* | 10/2007 | LaFauci | G06Q 30/06 |
| | | | | 705/15 |
| 2008/0010163 | A1* | 1/2008 | Kish | G06Q 30/0635 |
| | | | | 705/16 |
| 2008/0306826 | A1* | 12/2008 | Kramer | G06Q 30/0212 |
| | | | | 705/14.14 |
| 2009/0167553 | A1* | 7/2009 | Hong | G06Q 10/02 |
| | | | | 340/4.61 |
| 2009/0182630 | A1* | 7/2009 | Otto | G06Q 20/20 |
| | | | | 705/14.1 |
| 2009/0271322 | A1* | 10/2009 | Lay | G06Q 20/401 |
| | | | | 705/75 |
| 2010/0138289 | A1* | 6/2010 | Ferro | G06Q 30/0277 |
| | | | | 705/14.27 |
| 2010/0211428 | A1* | 8/2010 | Duffy | G06Q 10/06 |
| | | | | 705/7.14 |
| 2011/0093340 | A1* | 4/2011 | Kramer | G06Q 30/02 |
| | | | | 705/14.58 |
| 2011/0313871 | A1* | 12/2011 | Greenwood | G06Q 20/10 |
| | | | | 705/16 |
| 2012/0284063 | A1 | 11/2012 | Almonte | |
| 2013/0137464 | A1* | 5/2013 | Kramer | G06Q 30/02 |
| | | | | 455/456.3 |
| 2015/0156567 | A1* | 6/2015 | Oliver | G08B 13/1427 |
| | | | | 340/870.07 |
| 2015/0278926 | A1* | 10/2015 | Fang | G06Q 30/0635 |
| | | | | 705/15 |
| 2015/0294257 | A1* | 10/2015 | Raza | G06Q 10/06398 |
| | | | | 705/7.42 |
| 2016/0134753 | A1* | 5/2016 | Omiya | G06Q 10/063112 |
| | | | | 379/265.05 |
| 2016/0292600 | A1* | 10/2016 | Alex | G06N 7/08 |
| 2016/0350695 | A1* | 12/2016 | Koltunov | G06Q 10/063112 |
| 2017/0061392 | A1* | 3/2017 | Meza-Guinea | G06Q 10/1095 |
| 2017/0083848 | A1* | 3/2017 | Edelman | G06Q 30/0641 |
| 2017/0193530 | A1* | 7/2017 | Newsum | H04W 4/021 |
| 2017/0278145 | A1* | 9/2017 | Mimassi | G06Q 30/0281 |
| 2017/0278201 | A1* | 9/2017 | Mimassi | G06Q 50/12 |
| 2018/0053194 | A1* | 2/2018 | Bond | G07F 17/3234 |
| 2018/0160269 | A1* | 6/2018 | Baarman | G06Q 50/12 |
| 2019/0102709 | A1* | 4/2019 | Correa | G06N 20/00 |
| 2019/0333273 | A1* | 10/2019 | Nelson | G06T 19/006 |

OTHER PUBLICATIONS

Oracle Hospitality Reporting and Analytics Advanced—User Guide—Release 8.5.0 Oracle, Sep. 2015 (Year: 2015).*

Oracle Hospitality Simphony User Guide Release 2.8 Oracle, May 2016 (Year: 2016).*

NextPOS Software Manual—Software Version 2.8 User Manual NextPOS Corporation, 2002 (Year: 2002).*

* cited by examiner

US 10,943,193 B1

FOOD AND BEVERAGE VENUE MANAGEMENT SYSTEM

TECHNICAL FIELD

The present disclosure relates generally to a food and beverage venue management system. More particularly, the present disclosure relates to a food and beverage venue management system adapted to track the actions of customers and staff members, record the details of transactions, and provide management data and management controls to a manager to improve the operation of the venue.

BACKGROUND

The success of a bar, nightclub, restaurant, or other food and beverage venue depends on the ability of the venue to deliver quality food and beverages and consistent service, as well as the ability of the staff and managers to respond and adapt to the needs and preferences of customers. However, many venues, especially bars and nightclubs, routinely serve large numbers of customers and process many quick transactions, making it difficult for staff and managers to engage with customers and gain customer feedback, assess the performance of the staff, or judge the quality of the menu.

While repeat customers may develop a rapport with the staff, making it much easier to determine the preferences of such customers and obtain relevant customer feedback, staffing changes may result in new staff members being unfamiliar with such customers. Furthermore, high volume may cause staff to overlook repeat customers or otherwise be unable to provide the type of familiar service which repeat customers expect.

The point of sale systems utilized by many venues are able to provide managers with detailed information regarding overall sales and revenue, and may also indicate which menu items are popular through sales volume data. However, point of sale systems are unable to assess staff performance, obtain customer feedback, or provide insights into customer behavior, making it difficult for managers to accurately identify inconsistencies or shortcomings and formulate strategies for improving their business. Managers may be forced to personally and proactively monitor their staff to gauge their performance and mingle with customers to obtain their feedback. For a nightclub manager faced with an extremely busy night in a crowded and noisy club, this may prove to be an impossible task.

There is a need for a system which can automatically track and assess the actions of customers and staff and develop persistent customer and staff profiles, allowing the manager to identify long term trends and changes in activity within the venue, while presenting the resulting information to the manager in an integrated format which allows the manager to continually monitor the operation of the venue and interact with customers and direct the staff.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system which improves the operation of a food and beverage venue by tracking and analyzing the actions of the customers and staff members and the food and drink transactions within the venue. Accordingly, the present disclosure provides a venue management system comprising one or more customer client modules adapted to track customer actions using customer activity data, one or more staff client modules adapted to track staff actions using staff activity data, and a management control unit operably connected to the customer client modules and the staff client modules. The management control unit is further adapted to communicate with a point of sale system implemented at the venue level to receive venue data containing the details of each transaction within the venue and financial data detailing each payment associated with each transaction.

It is another aspect of an example embodiment in the present disclosure to provide a system which performs a detailed analysis of each transaction within the venue. Accordingly, the management control unit comprises an analytics module adapted to perform a transaction analysis function, whereby the analytics module is adapted to assess processing time, customer feedback, and performance data for each staff member to produce a transaction analysis report for each transaction.

It is still another aspect of an example embodiment in the present disclosure to provide a system which allows a manager to assess the operation of the venue, interact with the customers, and direct the staff. Accordingly, the venue management system further comprises a management client module having a management interface which is adapted to display management data and a set of management controls which allow the manager to interact with the customers and direct the staff.

It is yet another aspect of an example embodiment in the present disclosure to provide a system which allows the manager to access summaries of customer, staff, and venue activity in real-time. Accordingly, the management interface has a dashboard which displays a customer activity report, a staff activity report, and a venue activity report, which are each continuously updated.

It is a further aspect of an example embodiment in the present disclosure to provide a system which allows the manager to analyze customer, staff, and venue activity in depth. Accordingly, the management interface has a customer sub-interface, a staff sub-interface, and an analytics sub-interface, allowing the manager to view the customer actions of each customer, the staff actions of each staff member, and detailed analytics reports showing trends in the customer, staff, and venue data.

It is still a further aspect of an example embodiment in the present disclosure to provide a system which allows the manager to interact with the customers and direct the staff. Accordingly, the management interface is adapted to allow the manager to view a list of customers present within the venue and send a message and/or a complimentary menu item to each customer. The management interface is further adapted to allow the manager to view a list of current transactions and assign each staff member to process one of the current transactions.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
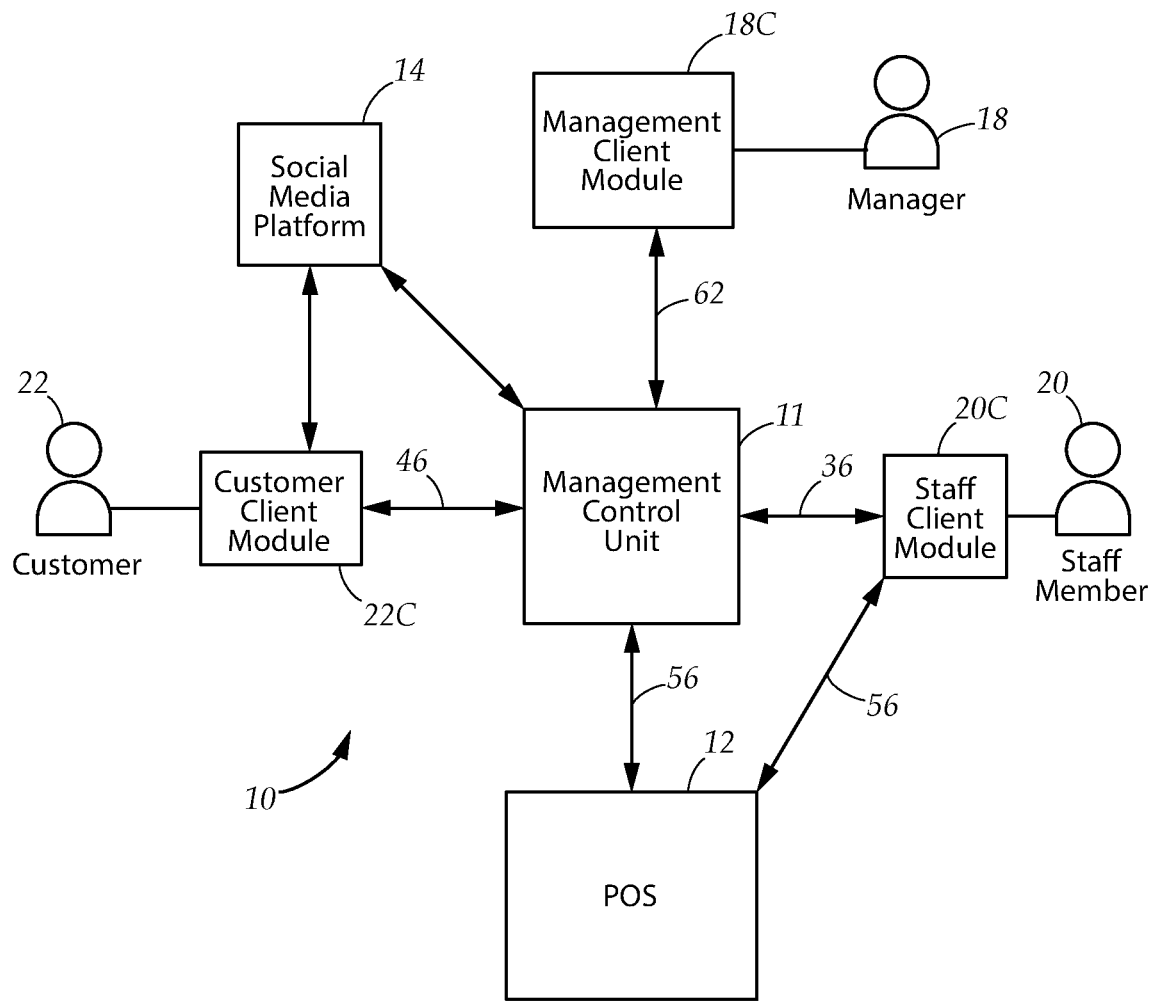
FIG. 1 is a block diagram depicting a food and beverage venue management system, in accordance with an embodiment of the present disclosure.

FIG. 1 illustrates a venue management system 10 for a food and beverage venue, comprising a management system control unit 11, a management client module 18C, at least one customer client module 22C, and at least one staff client module 20C. In a preferred embodiment, the venue management system 10 is adapted to operate in a food and beverage service environment such as a bar, nightclub, restaurant, or other venue which serves items of food and/or drink from a menu, and has one or more customers 22 and one or more staff members 20. The venue management system 10 is adapted to perform a set of management functions, and provide a manager 18 or other user with management data 62, allowing the manager 18 to monitor the activities of the customers 22 and staff members 20 as well as manage the operation of the venue in order to improve the efficiency and quality of the food and beverage service within the venue.

In a preferred embodiment, the management functions performed by the venue management system 10 may comprise: customer activity tracking, staff activity tracking, transaction analysis, payment tracking, menu management, managing customer loyalty and rewards, and distributing complimentary menu items. In order to carry out the management functions, the venue management system 10 is adapted to track and analyze the management data 62, which may comprise customer data 46, staff data 36, and venue data 56. The customer data 46 and staff data 36 may comprise items of customer activity data and items of staff activity data which quantify and describe customer actions performed by the customers 22 and staff actions performed by the staff members 20 within the venue. For example, the customer actions tracked using the customer activity tracking function may include: checking in to the venue, placing an order and initiating a food or drink transaction, interacting with staff members, submitting a payment for a transaction, interacting with other customers, participating in an event, submitting a review or rating, redeeming a loyalty reward, as well as other types of customer actions which typically occur within a food and beverage venue. In certain embodiments, the venue management system 10 may also be adapted to track customer activity using a social media platform 14. The venue may have an account on the social media platform 14, allowing the customer 22 to check in to or otherwise announce their presence within the venue using the social media platform. The venue management system 10 may therefore track the presence of customers 22 who do not check in directly using the customer client module 22C. The staff actions tracked via the staff activity tracking function may comprise processing a food or drink transaction, preparing food or drink items, interacting with customers, as well as other types of actions which may be carried out by staff members 20 within the venue. The staff data may also include performance data describing the quality of work performed by the staff members 20.

In a preferred embodiment, the venue management system 10 may be adapted to maintain a customer profile for each customer 22, and a staff member profile for each staff member 20. Each customer profile may contain customer profile items which record the customer activity data associated with the customer 22, while each staff member profile may contain staff profile items which record the staff activity data associated with each staff member 20. Customer profile items and staff member profile items may be processed by the venue management system as customer data 46 and staff data 36 respectively.

The venue data 56 quantifies and describes the operation of the venue and may comprise transaction data containing the details of each food or drink transaction within the venue, along with financial data corresponding to payments for transactions as well as any tips associated with the transaction. For example, referring briefly to FIG. 3C, the transaction data may include transaction data items 71 such as a transaction identifier, a transaction processing time as measured between an initiation time and a completion time, a list of menu items ordered, associated customers, associated staff members, the financial data associated with the transaction, as well as other information which may be relevant. Returning to FIG. 1, the venue management system 10 may maintain a transaction data log which records the transaction data and the financial data for each transaction made within the venue.

In a preferred embodiment, the venue management system 10 is adapted to combine customer data, staff data, and venue data 46, 36, 56 when performing the transaction analysis function. For example, by combining the rating submitted by the customer, the performance data of the staff member who prepared the items ordered in the transaction, and the transaction processing time, the venue management system 10 presents the manager 18 with a detailed assessment of the transaction including the customer's satisfaction with the transaction, the performance of the staff, along with the efficiency of the food and drink operation as measured by the transaction processing time.

The venue data may further comprise a set of menu data which contains the details of each food item and/or drink item which may be served within the venue, as well as event data which contains the details of events which may be held within the venue.

The management functions performed by the venue management system 10 are implemented through the management system control unit 11, which is operably connected with the management client module 18C, the customer client module 22C, and the staff client module 20C. Each customer 22 may interact with the venue management system 10 and perform customer actions using the customer client module 22C, while each staff member 20 may interact with the venue management system 10 and perform staff actions using the staff client module 20C. The customer client module 22C may be implemented as a portable computing device such as a smartphone or tablet, or a computing device such as a terminal or personal computer. Each customer client module 22C may be used by a single customer 22, or can be shared between multiple customers 22. The interactions between the customer 22 and the venue management system 10 may be carried out via a customer application implemented on the customer client module 22C or via a web portal. The staff client module 20C may be implemented as a portable computing device such as a smartphone or tablet, a stationary POS terminal, or a portable transaction scanner. Each staff client module 20C may be used by a single staff member 20 or by multiple staff members 20. The venue management system 10 is adapted to track the customer activity data and the staff activity data of each customer 22 and staff member 20 within the venue using the customer client module 22C and the staff client module 20C respectively. In a preferred embodiment, the venue management system 10 may track the transaction data and financial data of the venue by communicating with a point of sale or "POS" system 12 employed within the venue to facilitate the processing of food and drink transactions and payments. In certain embodiments, the venue management system 10 may incorporate integrated POS functionality, making it unnecessary to utilize a separate POS system to process transactions within the venue.

The venue management system 10 is adapted to continually track, combine, and analyze the customer, staff, and venue data 46, 36, 56 received from the customer client module 22C, staff client module 20C, and POS system 12, to produce the management data 62, which may be presented to the manager 18 via the management client module 18C.

Figure 2A:
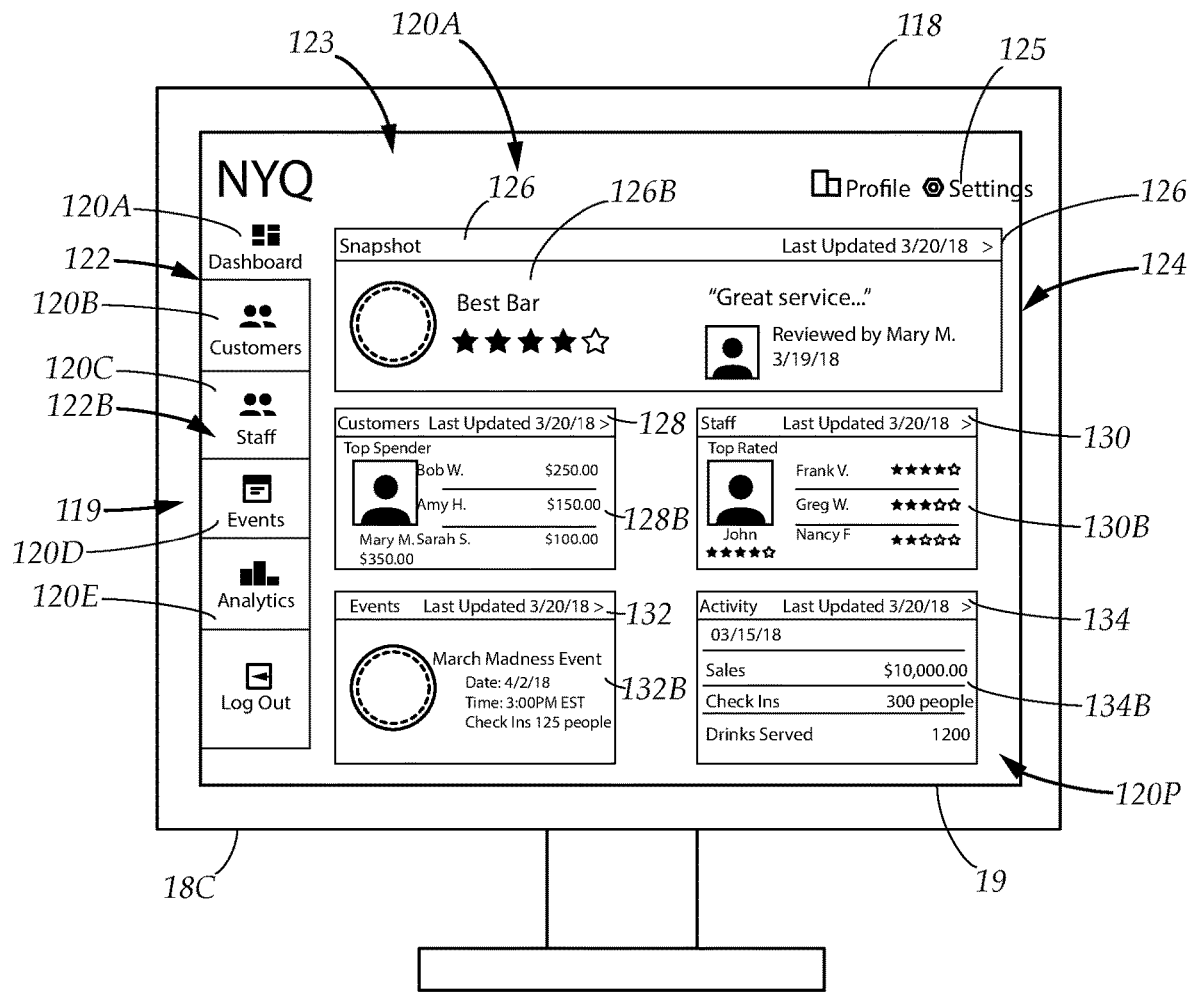
FIG. 2A is an elevational view showing an example embodiment of a management interface displayed on a management client module, in accordance with an embodiment of the present disclosure.

Turning to FIG. 2A while continuing to refer to FIG. 1, the management client module 18C is adapted to present the manager 18 with a management interface 118 in the form of a graphical user interface or "GUI". The management client module 18C may be a terminal, computer, a portable computing device such as a smartphone or tablet, or other suitable computing device equipped with a graphical output device 19 adapted to display the management interface 118. The manager 18 may interact with the management client module 18C via an input device such as a keyboard and mouse, or via touchscreen capabilities which may be built into the graphical output device 19. In a preferred embodiment, the management interface 118 is adapted to provide the manager 18 with the management data 62 in visual form. The management data 62 may be categorized and divided between a customer activity report 128B, a staff activity report 130B, and a venue activity report 134B. The management interface 118 may further have a plurality of sub-interfaces 119 comprising a dashboard 120A, a customer sub-interface 120B, a staff sub-interface 120C, and an events sub-interface 120D. Each sub-interface is adapted to present to the manager a portion of the management data 62.

Figure 3A:
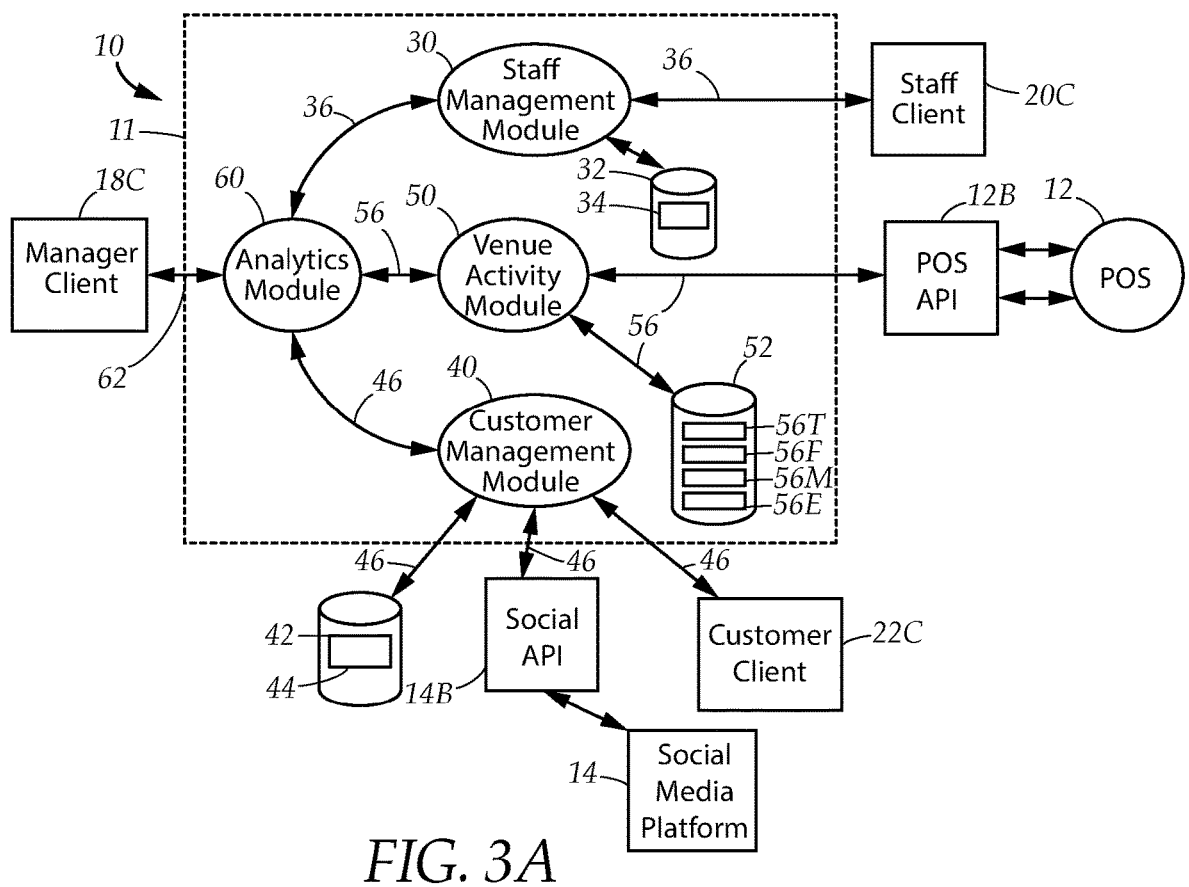
FIG. 3A is a block diagram showing a management control unit depicted within the dotted line, integrated within an implementation of the venue management system, in accordance with an embodiment of the present disclosure.
Figure 3B:
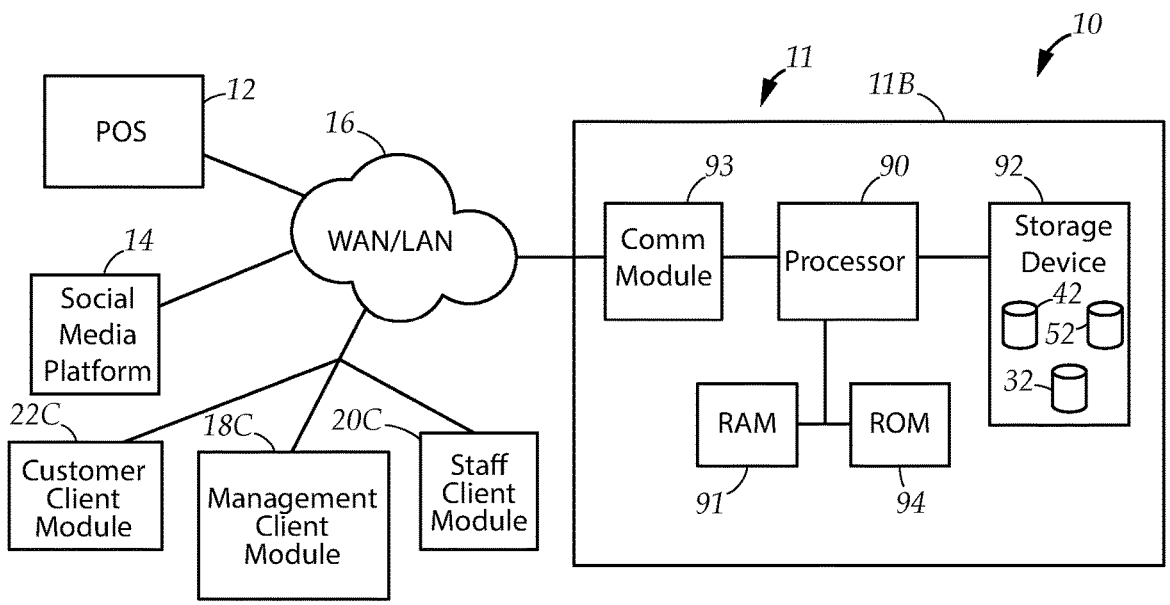
FIG. 3B is a block diagram showing an exemplary control unit server upon which the management control unit is implemented, in accordance with an embodiment of the present disclosure.

Turning now to FIGS. 3A-B while continuing to refer to FIG. 1, the management control unit 11 is adapted to continually track the customer, staff, and venue activity within the venue by receiving and analyzing customer, staff, and venue data 46, 36, 56 from the customer client modules 22C, staff client modules 20C, and the POS system 12. The management system control unit 11 may be implemented using a control unit server 11B. In a preferred embodiment, the control unit server 11B may comprise a processor 90, a storage device 92, and a communication module 93. The control unit server 11B may be connected to the management client module 18C, the customer client module 22C, the staff client module 20C, and the POS system 12 via a network 16, which may be either a LAN, a WAN such as the Internet, or a combination of both. Each of the customer, staff, and manager 22C, 20C, 18C may be operably connected to the venue management system 10 via a wireless communication interface such as WIFI, Bluetooth, or other protocol. The control unit server 11B may be implemented locally at the venue, or may be implemented as a remote application server accessible by the management, customer, and staff client modules 18C, 22C, 20C via the WAN. Similarly, the POS system 12 may either be implemented locally at the venue, or it may be a cloud-based POS system 12 which communicates with the control server 11B via the WAN 16. In certain embodiments, the venue management system 10 may be operably connected to the POS system 12 using a POS API 12B.

In a preferred embodiment, the management system control unit 11 may comprise an analytics module 60, a customer management module 40, a staff management module 30, and a venue activity module 50, through which the various management functions of the venue management system 10 may be implemented. The analytics, customer, staff, and venue activity modules 60, 40, 30, 50 may be interconnected, allowing customer, transaction, and venue data 46, 36, 56 to be shared between the modules. The management control unit 11 may further comprise a customer database 42 for storing the customer profile 44 for each customer 22, a staff database 32 for storing the staff member profile 34 of each staff member 20, and a venue database 52. The customer, staff, and venue databases 42, 32, 52 may be stored within the storage device 92 of the control unit server 11B.

Figure 3C:
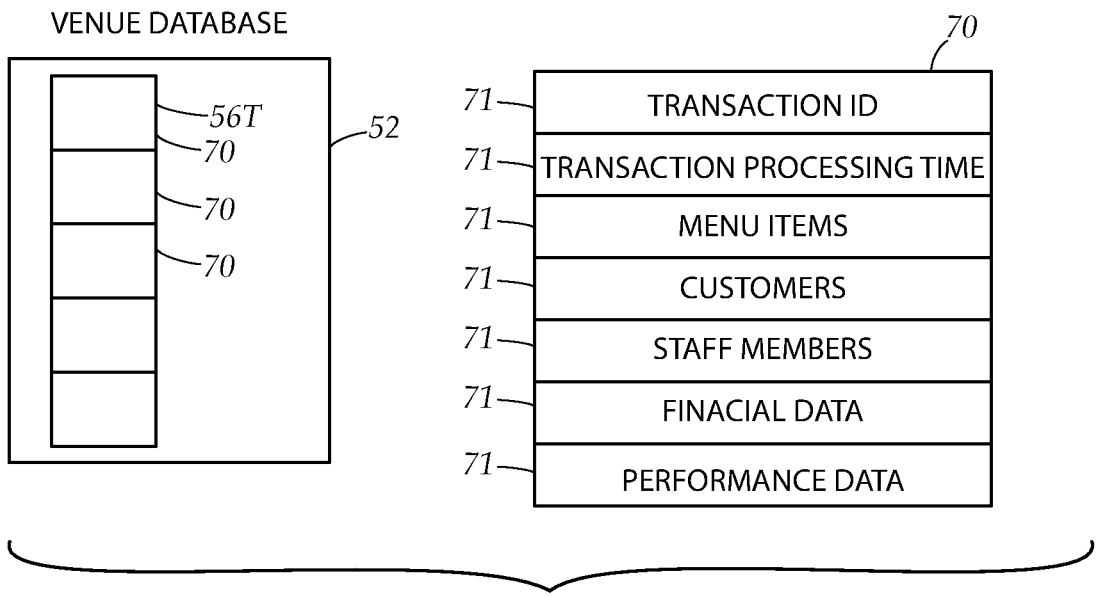
FIG. 3C is block diagram showing an exemplary venue database, in accordance with an embodiment of the present disclosure.

Continuing on to FIG. 3C, while also referring to FIGS. 1 and 3A, the venue activity module 50 is adapted to communicate with the POS system 12, and continually tracks transaction data and financial data within the venue data 56 received from the POS system 12. As each transaction within the venue is processed by the POS system 12, the venue activity module may store the transaction data and financial data for the transaction in the transaction data log 56T within the venue database 52. The transaction data log 56T may contain a transaction record 70 for each transaction, and the transaction record 70 may store the transaction data items 71 associated with each transaction. In certain embodiments, the venue activity module 50 may be operably connected to the POS system 12 using a POS API 12B. The venue activity module 50 may further be adapted to perform the menu management function by accessing and modifying menu data stored on the POS system 12, and may also be adapted to maintain a menu data log 56M within the venue database 52 which stores sales data and ratings data for each menu item.

Figure 3D:
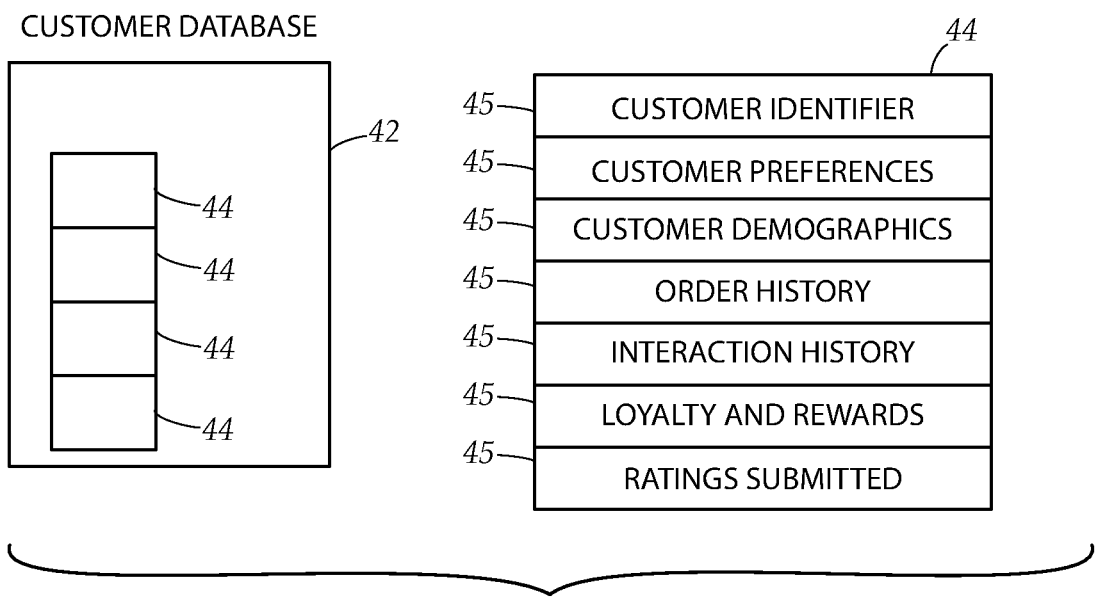
FIG. 3D is a block diagram showing an exemplary customer database containing a customer profile, in accordance with an embodiment of the present disclosure.

Referring now to FIG. 3D, while continuing to refer to FIG. 1 and FIG. 3A, the customer management module 40 is adapted to communicate with the customer client modules 22C and performs the customer activity tracking function by processing the customer data 46 as it is received from the customer client modules 22C, and updating the customer profile 44 with the relevant customer activity data. The customer management module 40 is preferably adapted to regularly determine which customers 22 are checked in to the venue, and will commence tracking the customer activity of each customer 22 who is checked in. The customer management module 40 may further be adapted to communicate with the social media platform 14 via a social media API 14B, enabling the venue management system to determine which customers 22 are checked in to the venue through the social media platform 14 instead of through the customer client module 22C.

Each customer profile 44 within the customer database 42 may contain a plurality of customer profile items 45. For example, the customer profile 44 may contain customer profile items such as a customer identifier which uniquely identifies the customer, customer demographic information, customer preferences, order history, interaction history, loyalty and rewards history, ratings data, as well as other items which may store relevant customer activity. For example, the customer preferences may identify favorite menu items for each customer, as well as other preferences such as a preferred seat or other individualized preference unique to the customer. The order history may include a complete list of transactions placed by the customer, which may also indicate the total amount spent by the customer. The interaction history may indicate which staff members the customer has interacted with. The loyalty and rewards history may include the details of any loyalty or rewards program which the venue utilizes to incentivize customers. For example, customers may earn loyalty points for checking in to the venue, placing orders, submitting ratings, attending events, as well as other customer actions which the manager may wish to incentivize. The ratings data may include a list of ratings which the customer has submitted. In a preferred embodiment, the ratings data may include menu item ratings, staff member performance reviews, overall satisfaction ratings, and other forms of customer feedback.

Returning to FIG. 3A while also referring to FIG. 1, the staff management module 30 is adapted to communicate with the staff client modules 20C and performs the staff activity tracking function by processing the staff data 36 as it is received from the staff client modules 20C, and updating the staff profile 34 of each staff member 20 with the relevant staff activity data. When each staff member 20 performs a staff action, the staff client module 20C used by the staff member 20 may send staff data 36 to the staff management module 30. The staff management module 30 may also be adapted to update the staff member profile of the staff member 20 by using the staff activity data within the staff data 36.

Figure 3E:
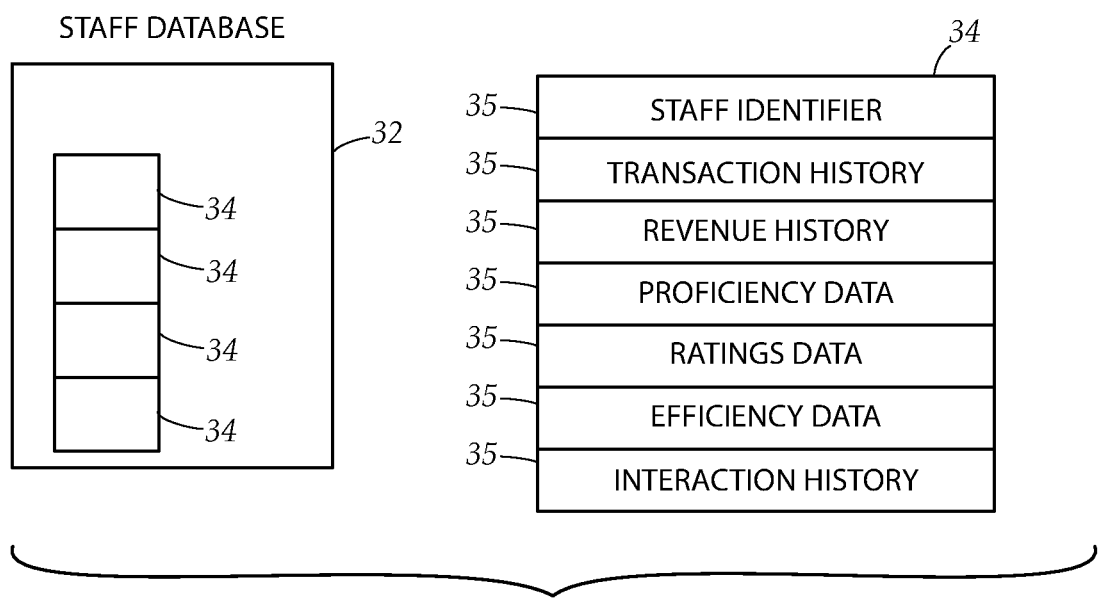
FIG. 3E is a block diagram showing an exemplary staff database containing a staff member profile, in accordance with an embodiment of the present disclosure.

Turning now to FIG. 3E, while continuing to refer to FIG. 3A, each staff member profile 34 within the staff database 32 may have a plurality of staff member profile items 35, including a staff identifier which uniquely identifies the staff member, a transaction history identifying each transaction the staff member was involved with, a revenue history showing the amount of revenue earned, performance data, and interaction history showing a list of customers with whom the staff member interacted with. The performance data may, for example, include proficiency data indicating the staff member's proficiency at performing tasks or preparing particular menu items, staff performance reviews submitted by customers, and an efficiency rating indicating the speed with which the staff member performs tasks. In certain embodiments, the staff performance review submitted by each customer may rate the quality of the staff actions performed by the staff member. For example, the staff performance review may describe the customer's satisfaction with the staff member's performance as a server, bartender, or other staff role, or may describe the customer's satisfaction with the skill of the staff member, such as the staff member's skill at preparing the drink or other menu item ordered.

Returning to FIG. 3A, while also referring to FIG. 1, the analytics module 60 may be adapted to perform the transaction analysis function by retrieving relevant customer, staff, and venue data 46, 36, 56 from the customer, staff, and venue activity modules 40, 30, 50. The analytics module 60 is also further adapted to communicate with the management client module 18C, and prepare the management data 62 for presentation to the manager 18.

The functions of the analytics module 60, the customer management module 40, the staff management module 30, and the venue module 50 may each be implemented using a single management system control unit 11, or be distributed across multiple management system control units 11.

Returning now to FIGS. 2A-B while continuing to refer to FIGS. 1 and 3A, in a preferred embodiment, the management interface 118 may comprise a main window 123 and a navigation bar 122. The navigation bar 122 may have a plurality of navigation elements 122B adapted to allow the manager 18 to select from the plurality of sub-interfaces 119, and the selected sub-interface may then be displayed within the main window 123. The main window 123 may in turn have a plurality of management panes 124. Each sub-interface and management pane 124 is adapted to quickly convey a portion of the management data 62 to the manager 18 or present the manager 18 with a set of management controls 125. Where the management client module 18C is a portable computing device such as a smartphone where the size of the graphical output device 19 is constrained, the management client module 18C may instead present the manager 18 with an alternate management interface 118B. For example, the alternative management interface 118B may present the navigation bar 122 along the bottom of the graphical output device 19, and the main window 123 may be positioned above the navigation bar 122 and present the management panes 124 in a single column which can be further navigated by scrolling. Note that the examples above are non-limiting, and the elements of the management interface and the alternate management interface 118B may be presented in other positions on the graphical output device 19 in accordance with the principles of the present disclosure.

Figure 2B:
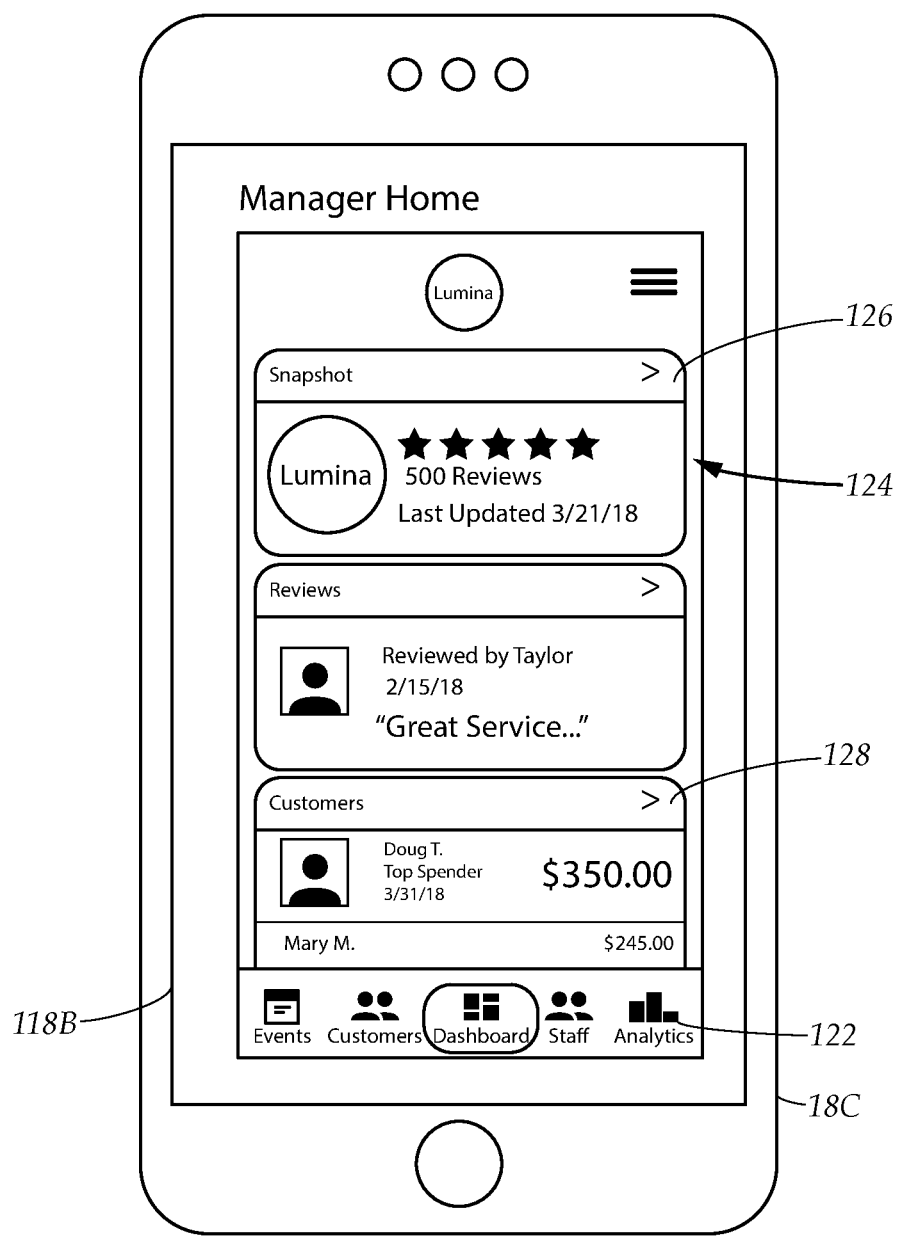
FIG. 2B is an elevational view showing an alternate embodiment of the management interface, in accordance with an embodiment of the present disclosure.

Referring now to FIGS. 2A-B, while also referring to FIG. 1 and FIGS. 3A-E, when the dashboard sub-interface 120A is selected by the manager 18 and becomes active, the management panes 124 displayed within the main window 123 may correspond to a plurality of dashboard management panes 120P comprising a customer summary pane 128, a staff summary pane 130, and a venue activity summary pane 134. The contents of the customer activity report 128B, the staff activity report 130B, and the venue activity report 134B may be displayed within the customer summary pane 128, the staff summary pane 130, and the venue activity summary pane 134 respectively. For example, the customer activity report 128B may include a list of top-spending customers along with the amount spent by each customer 22, which can be determined by analyzing the order history within the customer profile 44 of each customer 22. The staff activity report 130B may display a list of top earning staff members, which can be determined by analyzing the revenue history within the staff member profiles 34 of each staff member 20. The venue activity report 134B may include a venue activity summary including total sales revenue, a check in total which counts the number of customers 22 checked in to the venue, as well as a sales volume total counting the total number of menu items served, as determined by the venue data 56. The dashboard management panes 120P may also comprise an event summary pane 132 displaying an event summary report 132B. The dashboard management panes 120P may further comprise a snapshot pane 126 displaying venue rating data 126B, such as an overall venue rating and/or a list of customer venue reviews.

Figure 4:
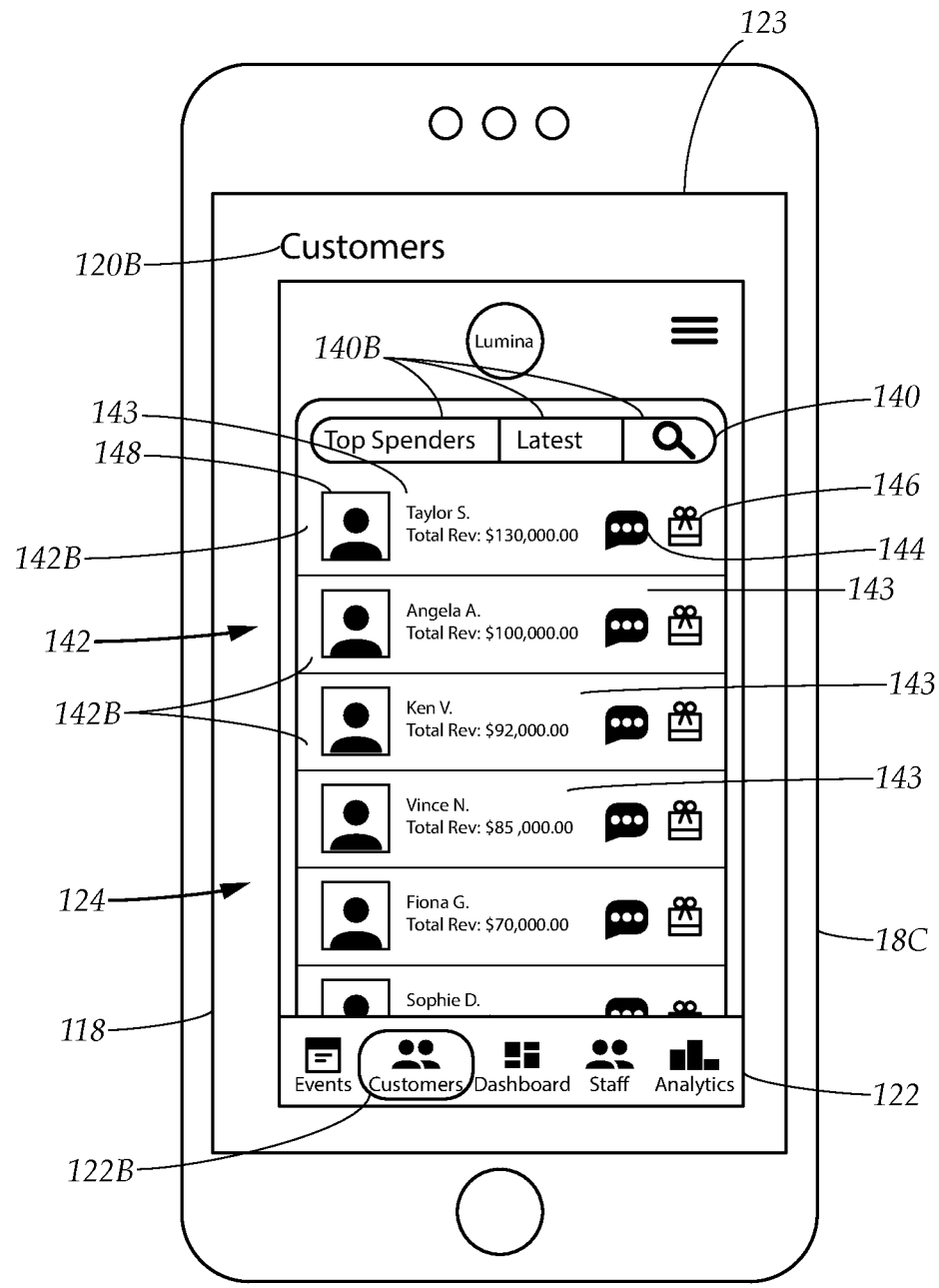
FIG. 4 is an elevational view showing a customer sub-interface implemented within the management interface, in accordance with an embodiment of the present disclosure.

Turning now to FIG. 4, while also referring to FIG. 1, FIG. 3A, and FIG. 3D, the management interface 118 may present the manager 18 with the customer sub-interface 120B upon the manager selecting the appropriate navigation element 122B. When the customer sub-interface 120B is displayed, the main window 123 may contain a customer data selection bar 140 having a plurality of customer data selection elements 140B. The management panes 124 may correspond to a customer list 142 having a plurality of customer entries 142B, with each customer entry 142B corresponding to an individual customer 22. Each customer data selection element 140B may correspond to a customer ranking metric, allowing the customer entries 142B to be sorted according to the customer ranking metric selected by the manager. For example, the customer ranking metrics may correspond to the amount spent by each customer and the time when each customer checked in. This allows the customer list 142 to be arranged to show the top spending customers in descending or ascending order, or show the order in which each customer checked in as well as show which customers checked in first or last. Each customer entry 142B may further display the name of the customer, as well as the amount of money spent by the customer. Through analysis of the order history stored within the customer profile 44 of each customer 22, the list of top spenders can be adjusted to cover the amount spent by each customer within different periods of time. The customer list 142 may also be used to display a list of all customers who are checked in to the venue, as determined by the customer activity tracking functions of the venue management system 10. Furthermore, the customer sub-interface may be adapted to allow the manager to view the customer profile 44 of each customer 22 by selecting the customer entry 142B associated with that customer.

Each customer entry 142B may further have a message icon 144 and a complimentary item icon 146. If the manager selects the message icon 144, the management client module 18C is adapted to allow the manager to compose and transmit a message to the customer 22 associated with the particular customer entry 142B, using a customer communication feature built in to the venue management system 10. If the manager selects the complimentary item icon 146, the customer may be awarded with a complimentary menu item, which can be implemented as a transaction which the customer is not required to submit payment for, or as a discount or promotion code which the customer may redeem within the venue. The customer sub-interface 120B may also display the ratings data associated with each customer, and may further be adapted to warn the manager or staff members of past or current complaints or poor ratings posted by dissatisfied customers, allowing the manager or staff members to address customer complaints and improve the overall level of customer service within the venue. Alternatively, the venue management system may allow customers to submit ratings anonymously.

Figure 5:
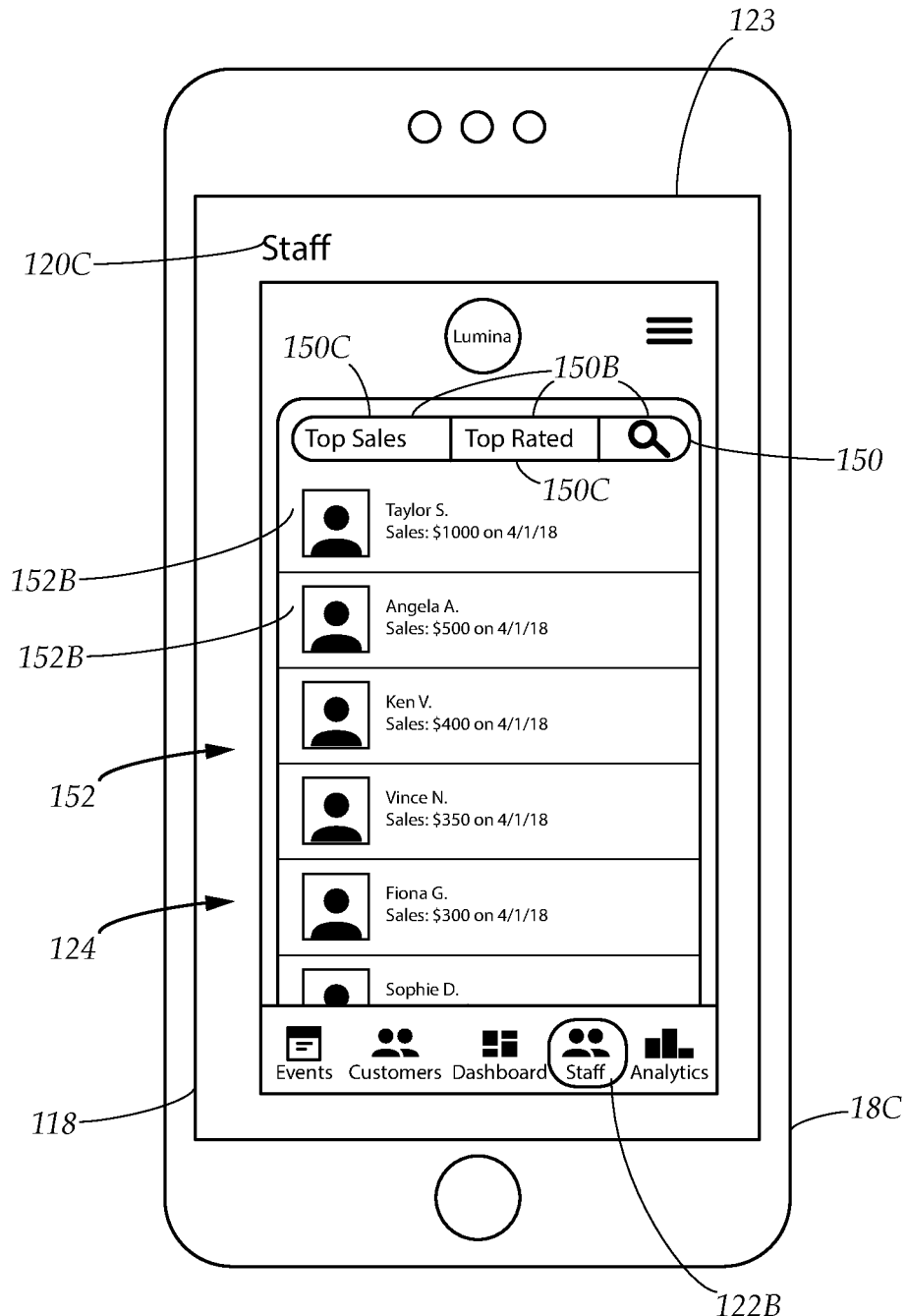
FIG. 5 is an elevational view, showing a staff sub-interface implemented within the management interface, in accordance with an embodiment of the present disclosure.

Turning now to FIG. 5, while also referring to FIG. 1, FIG. 3A, and FIG. 3E, the management interface 118 may be adapted to present the manager with the staff sub-interface 120C when the manager selects the appropriate navigation element 122B. When the staff sub-interface 120C is selected, the main window 123 may display a staff data selection bar 150 having a plurality of staff data selection elements 150B. The main window 123 may also display a staff member list 152 having a plurality of staff member entries 152B. Each staff data selection element 150B allows the staff member entries to be sorted according to a staff ranking metric 150C. The staff member entries 152B can further be arranged in ascending or descending order according to the selected staff ranking metric 150C. For example, the staff ranking metrics 150C may include a revenue metric, a ratings metric, and a sales volume metric. When the revenue metric is selected, the staff member entries 152B are arranged in order based on the revenue earned by each staff member 20, as determined by each staff member's staff member profile 34. The ratings metric allows the staff member entries 152B to be arranged in order of highest to lowest ratings or vice versa. The sales volume metric allows the staff member entries 152B to be arranged based on volume, such as the number of drinks sold, the number of orders or transactions processed, or the number of menu items prepared, as determined by the transaction history of each staff member 20. In other embodiments, the staff ranking metrics 150C may be based on any staff profile item.

The staff sub-interface 120C may further allow the staff member profile 34 of each staff member to be displayed when the manager selects the appropriate staff member entry 152B. The staff sub-interface 120C may further display the staff actions performed by each staff member 20 in real-time, based on the staff data collected by the staff client modules 20C, which allows the manager to monitor the staff members within the venue. In certain embodiments, the staff sub-interface 120C may also include a staff assignment function which allows a particular staff member to be assigned to process a particular transaction. For example, staff members may be assigned to each transaction based on which staff member is available. The venue management system 10 may also determine, based on the interaction history of each staff member with the customer, which staff member is best suited to assist the customer based on past interactions as well as ratings data posted for each staff member by the customer. The staff assignment function may also, for example, assign the staff member with the highest proficiency rating for the menu item in a particular transaction, to prepare that menu item. The staff management function may also assign multiple staff members to process each transaction. This allows the venue management system 10 to, for example, match each customer with the customer's preferred server as well as assign the most proficient staff member to prepare the customer's food or drink. The venue management system 10 may perform the staff assignment function automatically, or may present the manager with suggested staff assignments so that the manager may manually assign tasks to each staff member. For example, the staff member list within the staff sub-interface may include a staff assignment button for each staff member, allowing the manager to press the staff assignment button to view a list of current transactions and assign staff members to each transaction as needed.

The staff sub-interface 120C may also be adapted to perform a tip allocation function, allowing tips to be allocated amongst the staff members based on performance, with more tips allocated to staff members with the highest performance ratings, as well as by the amount of revenue earned. In a preferred embodiment, tips may be allocated amongst the staff members according to the staff ranking metrics, thus allowing highly performing staff members to be rewarded.

Figure 6:
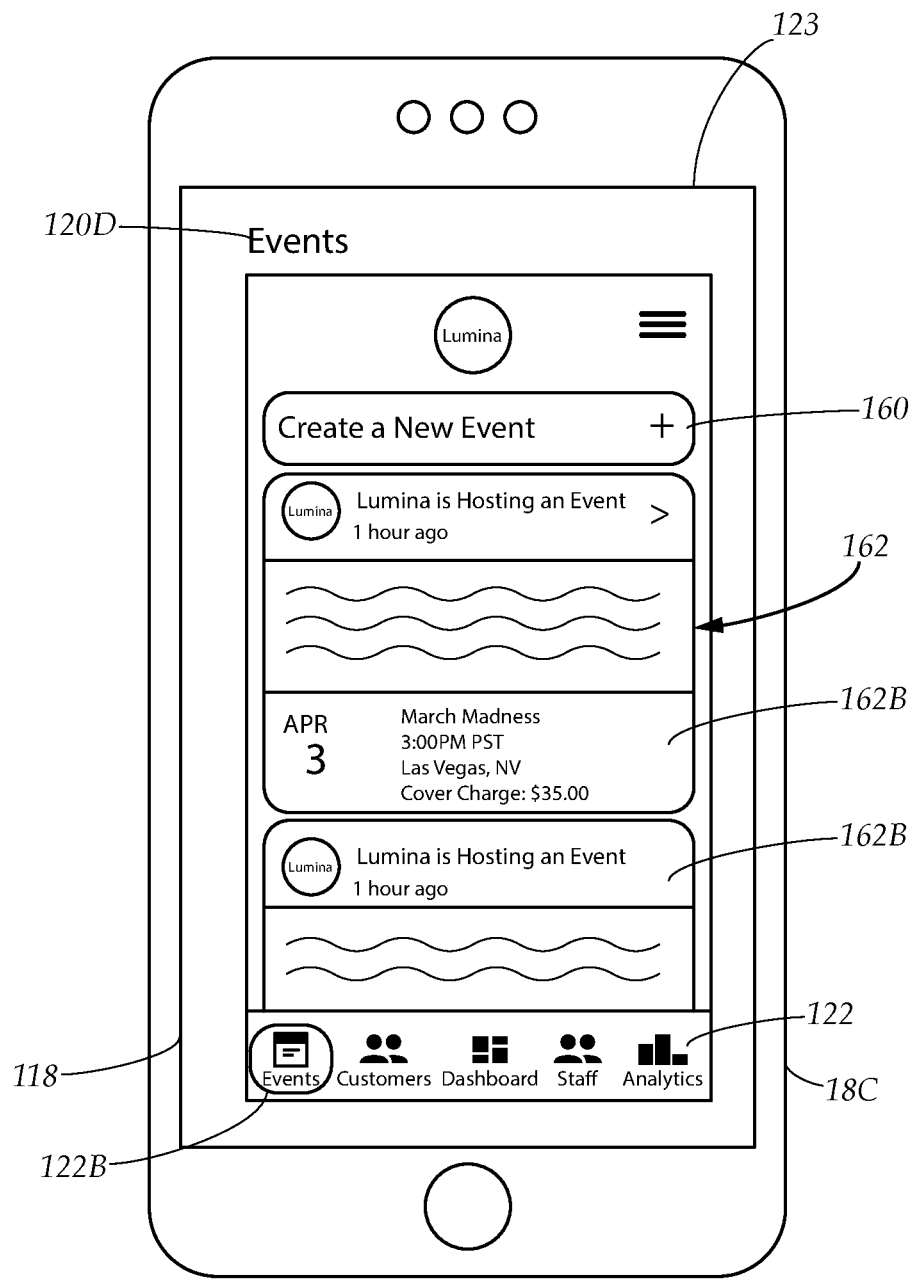
FIG. 6 is an elevational view, showing an events sub-interface implemented within the management interface, in accordance with an embodiment of the present disclosure.

Turning now to FIG. 6, while also referring to FIG. 1, FIG. 3A, and FIG. 3C, the management interface 118 may be adapted to present the events sub-interface 120D when the appropriate navigation element 122B is selected by the manager. When the events sub-interface 120D is selected, the main window 123 may include a create event button 160, along with an event list 162 having one or more event entries 162B. Each event may have a plurality of event attributes. For example, each event may have a list of participants and invitees, a list of assigned staff members, a list of event menu items with event discounts, an event time, and event sales and revenue data. The manager may create an event using the create event button 160, and the events sub-interface 120D may then present the manager with options to configure the event attributes. For example, the manager may set the event time, add customers to the participants and invitees list, add staff members to the list of assigned staff members, and choose which menu items will be added to the event menu items list as well as discounts. Each event entry 162B may correspond to an event which is in progress, which has already ended, or a future event. Each event may be a recurring event. For example, the manager may create a recurring event which begins every day at the same event time in order to implement a happy hour event. The events sub-interface may also present the manager with a menu management button for each event, which allows the manager to edit the menu data for any menu item within the menu to set an event discount which applies while the event is in progress.

The events sub-interface 120D may also be adapted to display the event summary report for each event within the event entry 162B which details the event attributes in full or in part. The event sub-interface 120D may also display a list of customers who are participating in the event in real-time, by tracking the customer activity data of each customer. The event sales and revenue data may contain a detailed list of menu items ordered by participants in the event as well as the revenue earned, by tracking the relevant transaction data associated with the event. This allows the manager to assess the performance of each event, and edit the event attributes as needed. For example, the manager may offer additional event discounts to increase sales, as well as offer discounts on the favorite menu items of the customers participating in the event.

Figure 7:
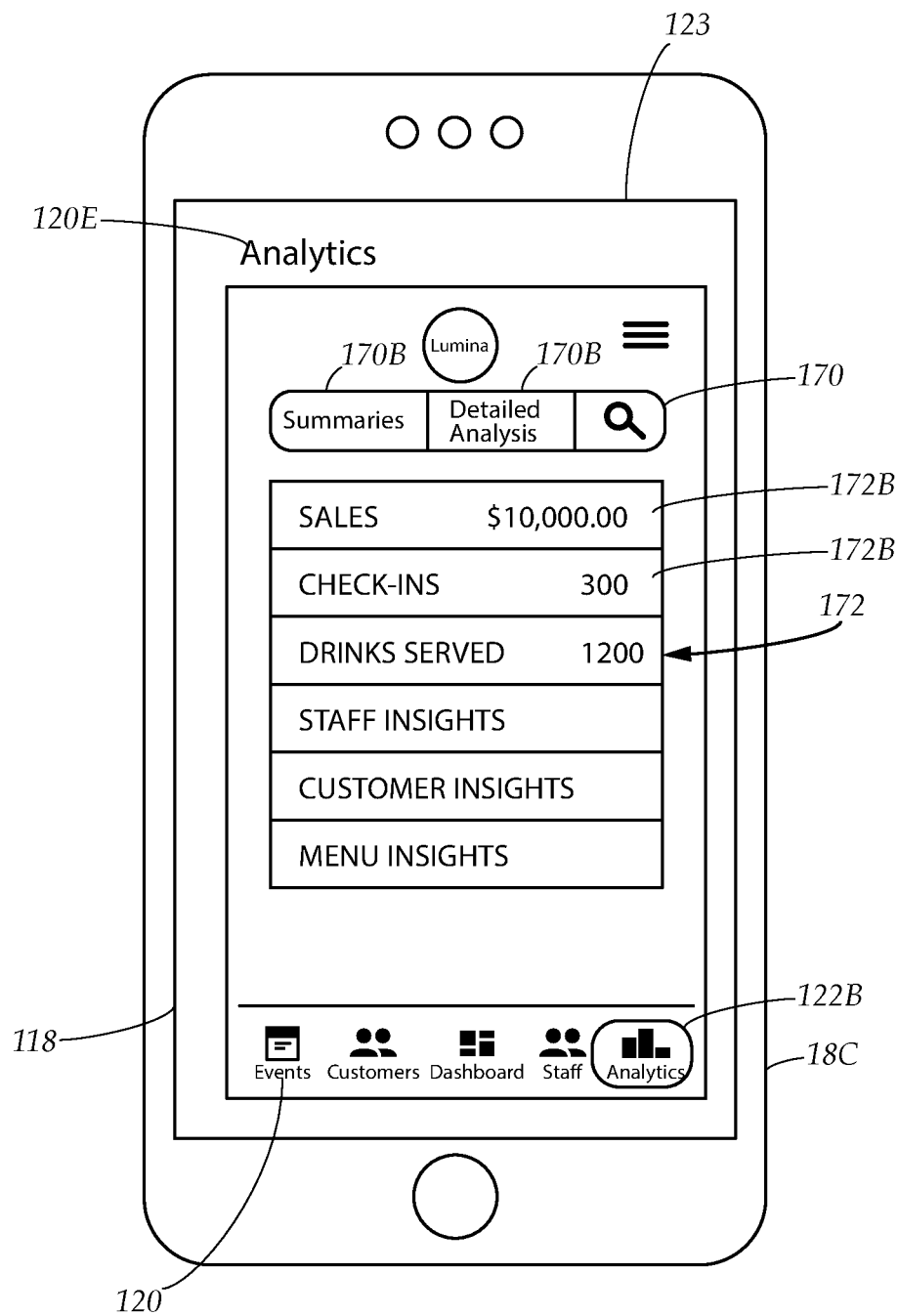
FIG. 7 is an elevational view, showing an analytics sub-interface implemented within the management interface, in accordance with an embodiment of the present disclosure.

Turning now to FIG. 7, while also referring to FIG. 1, FIG. 3A, and FIGS. 3C-3E, the management interface 118 may be adapted to display the analytics sub-interface 120E when the appropriate navigation element 122B is selected. When the analytics sub-interface is selected, the main window 123 may display an analytic data selection bar 170 having a plurality of analytics data selection elements 170B. The main window 123 may also display a list of analytics panes 172. Each analytic pane 172 may display an analytics report 172B. The analytics data selection elements 170B may, for example, be adapted to populate the list of analytics panes 172 with summarized analytics reports or detailed analytics reports. For example, the summarized reports may include a sales summary displaying the revenue earned within the venue, a check-ins summary displaying the number of customers who are checked in to the venue, a sales volume summary displaying the number of menu items served, a list of best-selling menu items, a staff activity summary detailing the staff activity within the venue, a customer activity summary detailing the customer activity within the venue, and/or a transaction summary which may contain the details of all the transactions processed by the venue and/or the details of all payments made within the venue.

The detailed analytics reports may utilize the transaction analysis capabilities of the venue management system 10 to produce detailed reports of customer activity, staff activity, and venue data. The detailed analytics report may identify trends in the customer data, staff data, and venue data which allow the manager to identify strengths or shortcomings in the operation of the venue. The detailed analytics reports may include a customer insight report, a staff insight report, and a venue insight report. The customer insights report utilizes the customer activity data and the transaction data to determine customer spending habits. For example, the venue management system 10 may divide the customers into demographic groups in order to determine which menu items are the most popular with each demographic group, or when the customers within each demographic group prefer to visit the venue. The staff insights report may utilize the staff activity data to assess changes or trends in the revenue, sales output, and performance data for the staff members, and may further identify staffing changes, menu changes, or other changes to the operation of the venue which may coincide with the changes or trends in the staff activity data to determine the causes of the changes or trends. The venue insights report may also identify changes in sales which occur after changes to the menu, staffing changes, or other changes.

Figure 8:
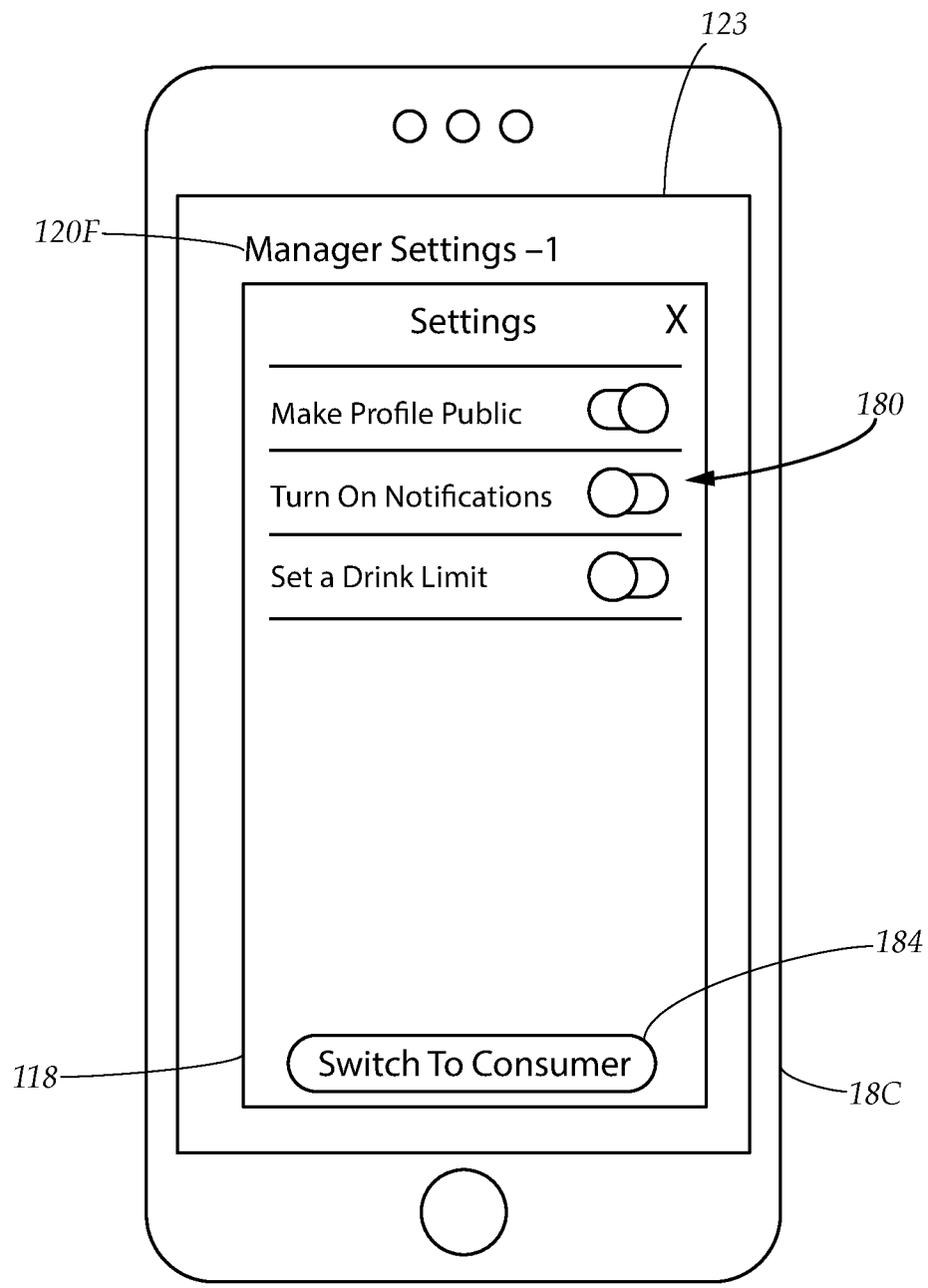
FIG. 8 is an elevational view, showing a manager settings sub-interface, in accordance with an embodiment of the present disclosure.

Turning now to FIG. 8 while also referring to FIG. 1, the management interface 118 may further be adapted to display a manager settings sub-interface 120F which contains a set of venue controls 180. The venue controls may include venue profile controls, which allow the manager to create and edit a venue profile which may be shown to customers 22 via the customer client modules 22C. The venue profile may contain information about the venue, the menu, events, or other relevant details for promoting the venue. The venue controls may contain a customer view mode button 184, which may display a version of the venue profile which would be displayed to the customers. The venue controls may also allow the manager to send notifications to the customers via the customer client modules 22C, which may be sent via the customer communication feature. The venue controls may also allow the manager to set a venue-wide drink limit. The venue management system 10 may utilize customer activity data and/or transaction data to automatically track the number of drinks consumed or ordered by each customer, and may prevent the customer from placing further orders for drink menu items once the drink limit has been exceeded by the customer. The venue management system 10 may alert the customer 22 via the customer client module 22C, and may also prevent the POS system from processing further transactions for drink menu items for the customer. The venue management system 10 may further alert the staff members 20 and/or the manager via the staff client module 20C or the management client module 18C that the drink limit has been exceeded.

In certain embodiments, the management functions may further include a customer transportation function. The customer transportation function allows the venue management system 10 to arrange transportation for the customer, such as in the event the customer is incapable of driving, or if the customer is in need of transportation. In a preferred embodiment, the venue management system 10 is adapted to communicate with a transportation service such as a ride hailing or ride sharing service to transport the customer to their home or another desired location. The management interface 118 may be adapted to allow the manager to activate the customer transportation function on behalf of the customer. In certain embodiments, the customer may preset the customer's home address or preferred destination when creating the customer profile, which may be kept hidden from the manager or staff members for privacy. The customer transportation function may also be adapted to send a safe arrival alert to the management client module 18C, allowing the manager to confirm that the customer has arrived safely at the destination. In certain embodiments, the customer client module 22C may employ location functions such as GPS to alert the venue management system 10 of the customer's arrival at the destination, or the venue management system 10 may be adapted to receive confirmation from the transportation service when the customer arrives at the destination.

Figure 9:
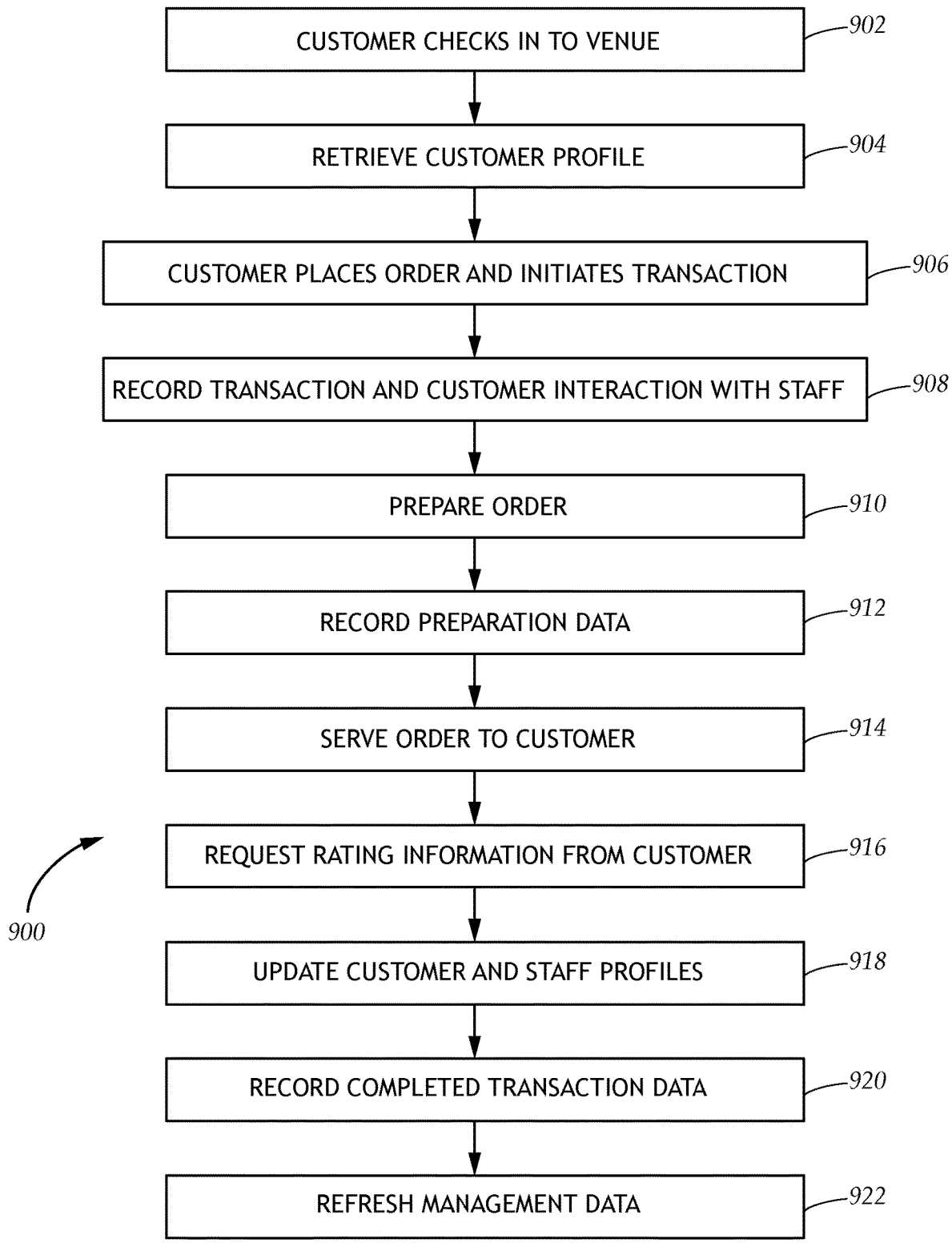
FIG. 9 is a flowchart showing an exemplary management data tracking process, in accordance with an embodiment of the present disclosure.

Turning now to FIG. 9, while also referring to FIG. 1 and FIGS. 3A-3E, an exemplary management data tracking process 900 is shown, depicting the venue management system 10 tracking a transaction as well as the associates customer and staff activity. The process 900 begins at step 902, when the customer 22 checks in to the venue. The customer 22 may activate the customer application on the customer client module 22C to establish a connection with the venue management system 10 upon entering the venue. Alternatively, the customer application may automatically detect the presence of the customer inside the venue via location sensing through GPS, NFC signal, or other electronic contextual cues, and prompt the customer to check in to the venue. The venue management system 10 may also detect the customer's checking in to the venue via the social media platform 14. Once the customer checks in, the process proceeds to step 904 and the venue management system 10 may retrieve the customer profile of the customer, or prompt the customer to create a customer profile. The venue management system 10, will then record the customer as being present within the venue and begin tracking the customer activity of the customer.

Once the customer wishes to place an order, the process proceeds to step 906. The customer may place an order via the customer client module 22C, or by interacting with a staff member 20. The staff member 20 may also place the order through the staff client module 20C on behalf of the customer. The process then proceeds to step 908, and the venue management system 10 records the transaction and the relevant transaction data, and may also record the interaction between the customer and the staff member. The process then proceeds to step 910, and the venue begins to process the transaction and prepare the menu item ordered. At this point, the transaction may be displayed within the management interface as a pending transaction, allowing the manager to view the progress of the transaction. The process may then proceed to step 912, and the staff client module 20C may record the processing time of the transaction. The staff client module 20C may also track efficiency data for the staff member who prepares the menu item, by measuring the amount of time necessary to prepare the menu item to determine the efficiency rating. For example, staff members who often exceed a standard preparation time may receive a low efficiency rating.

When the menu item is complete, the process proceeds to step 914 and the menu item is served to the customer. The venue management system 10 may then record that the order has been served to the customer, and may update the performance data to the relevant staff member profiles. Payment may be made for the transaction at any time before or after the menu item is served to the customer, and the details of the payment may be stored in the transaction data log.

Once the customer has received the menu item, process may proceed to step 916 and the venue management system 10 may request that the customer submit ratings data or other feedback. Ratings data may be submitted directly via the customer client module 22C. Once the payment for the transaction is submitted and the customer supplies the requested rating data or otherwise declines to supply the rating data, the process proceeds to step 920 and the venue management system 10 records the transaction as complete. The ratings data is then recorded as appropriate to the staff member profile, the customer profile, or the menu data. The process then proceeds to step 922 and the venue management system 10 may present the manager with a transaction analysis of the completed transaction. The venue management system 10 continually tracks the customer data, staff data, and venue data for each transaction, allowing the manager to monitor and assess the operation of the venue. Note that the exemplary process 900 is non-limiting, and the steps may be varied in accordance with the principles of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a food and beverage venue management system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for managing operations within a food and beverage venue having a point of sale system adapted to facilitate the order of a menu item by one or more customers via a transaction, the venue further having one or more staff members and a manager, the method comprising the steps of:
   providing a customer client device with a customer client module adapted to gather customer activity data corresponding to one or more customer actions, the customer actions comprising checking in to the venue, ordering a menu item by initiating a transaction, and submitting a staff member performance review;
   providing a staff member client device with a staff client module adapted to gather staff activity data corresponding to one or more staff actions, the staff actions comprising processing the transaction, and preparing the menu item associated with the transaction;
   providing a manager client device with management client module having a graphical output device, the management client module is adapted to display a management interface;
   providing a management control server operably connected, via a computer network, to the point of sale system, the customer client module, the staff client module, and the management client module, the management control server comprising:
     an analytics module,
     a customer management module and a customer database, and
     a staff management module and a staff database;
   tracking customer activity, whereby the customer client module determines the number of customers checked in to the venue, and the customer management module tracks the customer actions performed by each customer, and stores the customer activity data for the customer actions to a customer profile for the customer in the customer database;
   tracking staff activity, whereby the staff client module tracks the staff actions performed by each of a plurality staff members, the plurality of staff members including a server and a menu item preparer, and the staff management module determines a performance rating for each staff member, and stores the staff activity data for the staff actions to a staff profile for the staff member in the staff database, wherein the staff performance rating includes a proficiency rating for a menu item;
   tracking venue activity, whereby the management control server receives and tracks transaction data for each transaction from the point of sale system, whereby the transaction data describes the menu item ordered, and identifies each customer and each staff member associated with the transaction;
   storing an interaction between each customer and each staff member to an interaction history of the staff profile, the customer profile, or both, whereby the management control server is configured to automatically match and assign the plurality of staff members to one or more of the customers based on the interaction history and staff performance ratings, the management control server being configured to select the customer's preferred server and the menu item preparer with a highest proficiency rating for preparing the customer's ordered menu item;
   generating a customer activity report containing the customer actions performed by each customer, whereby the analytics module analyzes the customer activity data and ranks each customer according to a customer ranking metric;
   generating a staff activity report containing the staff actions performed by each staff member, whereby the analytics module analyzes the staff activity data and ranks each staff member according to a staff ranking metric;
   generating a venue activity report, whereby the analytics module analyzes the customer activity data, the staff activity data, and the transaction data to produce the venue activity report containing a revenue total for each transaction, a check in total which counts each customer checked in to the venue, and a sales volume total counting the number of menu items served; and
   presenting the manager with management data via the management interface, whereby the management data contains the customer activity report, the staff activity report, and the venue activity report.

2. The method for managing operations within a food and beverage venue as described in claim 1, wherein:
   the management interface has a plurality of sub-interfaces and a plurality of navigation elements each corresponding to one of the plurality of sub-interfaces, the sub-interfaces comprise a dashboard, a customer sub-interface, a staff sub-interface, and an analytics sub-interface; and
   the steps as recited further comprise the step of selecting the sub-interface, whereby the manager presses the navigation element to select the sub-interface corresponding to the pressed navigation element.

3. The method for managing operations within a food and beverage venue as described in claim 2, further comprising the step of:
   displaying the dashboard, whereby the management interface displays the dashboard upon the manager pressing the navigation element corresponding to the dashboard, the dashboard displays a customer summary pane containing the customer activity report, a staff summary pane containing the staff summary report, and a venue activity pane containing the venue activity report.

4. The method for managing operations within a food and beverage venue as described in claim 3, wherein:
   the customer ranking metric is selectable by the manager and comprises the amount spent by each customer and the time when each customer checked in; and
   the steps as recited further comprise the step of displaying the customer sub-interface, whereby the management interface displays the customer sub-interface upon the manager pressing its corresponding navigation element, the customer sub-interface displays a customer data selection bar which allows the manager to select the customer ranking metric, and a customer list ranked according to the selected customer ranking metric.

5. The method for managing operations within a food and beverage venue as described in claim 4, wherein:

the staff ranking metric is selectable by the manager and comprises a revenue metric based on the total revenue earned by each staff member, a ratings metric based on the performance rating of each staff member, and a sales volume metric based on the number of orders processed be each staff member; and the steps as recited further comprise the step of displaying the staff sub-interface, whereby the management interface displays the staff sub-interface upon the manager pressing its corresponding navigation element, the staff sub-interface displays a staff data selection bar which allows the manager to select the staff ranking metric, and a staff member list ranked according to the selected staff ranking metric.

6. The method for managing operations within a food and beverage venue as described in claim 5, further comprising the step of:

displaying the analytics sub-interface, whereby the management interface displays the analytics sub-interface upon the manager pressing its corresponding navigation element, the analytics sub interface displays a detailed analytics report whereby the analytics module analyzes the customer activity data, staff activity data, and venue data to identify changes or trends therewith.

7. The method for managing operations within a food and beverage venue as described in claim 6, wherein:

the plurality of sub-interfaces further comprises an event sub-interface; and the steps as recited further comprise the step of displaying the event sub-interface, whereby the management interface displays the event sub-interface upon the manager pressing its corresponding navigation element, the event sub-interface displays a create event button which allows the manager to create an event taking place within the venue, the event sub-interface further displays an event summary report for each event showing a count of each customer participating in the event.

8. The method for managing operations within a food and beverage venue as described in claim 7, wherein the step of tracking staff activity further comprises determining an efficiency rating by measuring the processing time of the transaction, and determining the performance rating by assessing the staff member performance review submitted by each customer in combination with the efficiency rating.

9. The method for managing operations within a food and beverage venue as described in claim 8, wherein the step of displaying the analytics sub-interface further comprises displaying a transaction analysis report identifying the customer who initiated the transaction, the menu item ordered, the staff member performance review submitted by the customer, and the efficiency rating of the staff member associated with the transaction.

10. The method for managing operations within a food and beverage venue as described in claim 9, wherein the step of displaying the customer sub-interface further comprises displaying a message icon for each customer within the customer list, and sending a message to the customer, whereby the manager presses the message icon to send the message to the customer.

11. The method for managing operations within a food and beverage venue as described in claim 10, wherein the step of displaying the customer sub-interface further comprises displaying a complimentary item icon for each customer within the customer list, and sending a complimentary menu item to the customer, whereby the manager presses the complimentary item icon to send a complimentary menu item to the customer.

12. The method for managing operations within a food and beverage venue as described in claim 11, wherein:

the plurality of sub-interfaces further comprises a manager settings sub-interface; and the steps as recited further comprise the step of displaying the manager settings sub-interface, whereby the management interface displays the manager settings sub-interface upon the manager pressing its corresponding navigation element, the manager settings sub-interface displays a plurality of venue controls comprising venue profile controls and a venue-wide drink limit control, the venue profile controls allow the manager to create and edit a venue profile containing venue details and menu information which is displayed to each customer via the customer client module, and the venue wide drink limit control allows the manager to set a drink limit for each customer, whereby the point of sale system prevents the customer from ordering further drink menu items for the customer once the customer exceeds the drink limit.

13. The method for managing operations within a food and beverage venue as described in claim 12, further comprising the steps of:

providing a customer transportation function, whereby the management control server is adapted to communicate with a transportation service, allowing the manager to arrange for the transportation service to transport the customer to a home destination, and the management control server is further adapted to receive a safe arrival alert from the customer client module or the transportation service upon the customer's arrival at the home destination.

14. The method for managing operations within a food and beverage venue as described in claim 13, wherein the step of displaying the staff sub-interface further comprises:

displaying a staff assignment button for each staff member within the staff member list, displaying a list of current transactions upon the manager pressing the staff assignment button, and assigning the staff member to one of the transactions in the list of current transactions.

15. The method for managing operations within a food and beverage venue as described in claim 14, wherein the step of displaying the staff sub-interface further comprises:

automatically present a suggested staff assignment for one or more of the current transactions based on the staff members matched to the customer by the venue management server.

16. The method for managing operations within a food and beverage venue as described in claim 14, wherein the step of displaying the staff sub-interface further comprises:

automatically assigning the staff members to one or more of the transactions based on the staff members matched to customer by the venue management server.

* * * * *